(12) United States Patent
Caspi et al.

(10) Patent No.: US 6,223,880 B1
(45) Date of Patent: *May 1, 2001

(54) CONVEYOR TABLE HAVING SELECTIVELY ENABLED CONVEYOR ELEMENTS

(75) Inventors: Amiram Caspi, Rehovot; Zamir Halutz, Tel Aviv, both of (IL)

(73) Assignee: Orbotech Ltd., Yavne (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/803,403

(22) Filed: Feb. 20, 1997

(30) Foreign Application Priority Data

Feb. 23, 1996 (IL) ........................................................ 117242

(51) Int. Cl.⁷ .................................................. B65G 37/00
(52) U.S. Cl. ................ 198/346.2; 198/809; 198/370.09; 198/369.6; 198/369.1
(58) Field of Search ................ 198/809, 369.1, 198/369.6, 370.08, 370.09, 339.1, 346.2

(56) References Cited

U.S. PATENT DOCUMENTS

| | | | |
|---|---|---|---|
| 2,645,365 | * 7/1953 | Haessler | 198/339.1 |
| 3,052,339 | * 9/1962 | Carter | 198/809 X |

(List continued on next page.)

FOREIGN PATENT DOCUMENTS

| | | | |
|---|---|---|---|
| 835748 | 5/1976 | (BE) . | |
| 35 26 634 | 2/1987 | (DE) . | |
| 0 477 104 | 3/1992 | (EP) . | |
| 0 841 844 | 5/1998 | (EP) . | |
| 0 855 856 | 7/1998 | (EP) . | |
| 2599347 | 12/1987 | (FR) . | |
| 2049503 | * 12/1980 | (GB) | 198/339.1 |
| 2155910 | 10/1985 | (GB) . | |
| 112702 | 2/1995 | (IL) . | |
| 0149134 | * 9/1982 | (JP) | 198/339.1 |
| 60-188232 | 9/1985 | (JP) . | |
| 0051407 | * 3/1986 | (JP) | 198/346.2 |
| 5-105238 | 4/1993 | (JP) . | |

OTHER PUBLICATIONS

English Abstract of JP60188232 dated Sep. 25, 1985.

Derwent Abstract of EP 0841844 dated May 13, 1998.

Primary Examiner—Robert P. Olszewski
Assistant Examiner—Steven B. McAllister
(74) Attorney, Agent, or Firm—Ladas & Parry

(57) ABSTRACT

This invention discloses a conveyor table, including a supporting construction having a first supporting surface for supporting articles to be conveyed, a plurality of conveyor elements mounted to the supporting construction and defining a second supporting surface for supporting the articles to be conveyed, an actuator for selectively moving one of the supporting surfaces with respect to the other to selectively enable either the first supporting surface defined by the supporting construction to support the articles, or the second supporting surface defined by the conveyor elements to support the articles, and a drive for driving the conveyor elements to convey the articles in a predetermined direction when the articles are supported by the second supporting surface defined by the conveyor elements.

17 Claims, 8 Drawing Sheets

U.S. PATENT DOCUMENTS

| | | | |
|---|---|---|---|
| 3,169,446 | * | 2/1965 | Anderson et al. ................. 198/339.1 |
| 3,522,942 | * | 8/1970 | Hepp ............................ 198/370.08 X |
| 3,680,677 | * | 8/1972 | Branch et al. ..................... 198/369.6 |
| 3,938,643 | * | 2/1976 | Parker ................................ 198/339.1 |
| 4,274,529 | | 6/1981 | Mori et al. ............................ 198/339 |
| 4,301,958 | * | 11/1981 | Hatakenaka et al. ......... 198/369.1 X |
| 4,371,074 | * | 2/1983 | Off et al. ............................ 198/339.1 |
| 4,730,526 | | 3/1988 | Pearl et al. ................................ 83/71 |
| 4,747,477 | * | 5/1988 | Benz et al. ................... 198/369.6 X |
| 4,754,863 | * | 7/1988 | Tsuchiya et al. ................. 198/339.1 |
| 4,846,623 | * | 7/1989 | Otani et al. ....................... 198/339.1 |
| 4,962,841 | * | 10/1990 | Kloosterhouse ................ 198/370.09 |
| 4,982,728 | * | 1/1991 | Masuda et al. ................... 198/339.1 |
| 4,999,578 | * | 3/1991 | Ohashi et al. ..................... 198/346.2 |
| 5,084,829 | | 1/1992 | Kato ....................................... 395/80 |
| 5,125,497 | * | 6/1992 | Sundermann .................... 198/809 X |
| 5,165,516 | * | 11/1992 | Reed et al. ....................... 198/809 X |
| 5,222,585 | | 6/1993 | Van Der Werff .................... 198/372 |
| 5,352,085 | | 10/1994 | Sargent et al. ........................ 414/796 |
| 5,366,212 | | 11/1994 | Crowley et al. ....................... 270/95 |
| 5,441,380 | | 8/1995 | Horikawa .......................... 414/788.7 |
| 5,449,409 | * | 9/1995 | Baccini ............................. 198/346.2 |
| 5,533,861 | | 7/1996 | Klupfel ............................. 414/794.2 |
| 5,588,797 | | 12/1996 | Smith ................................ 414/797.5 |
| 5,609,236 | * | 3/1997 | Neukem ...................... 198/370.08 X |

* cited by examiner

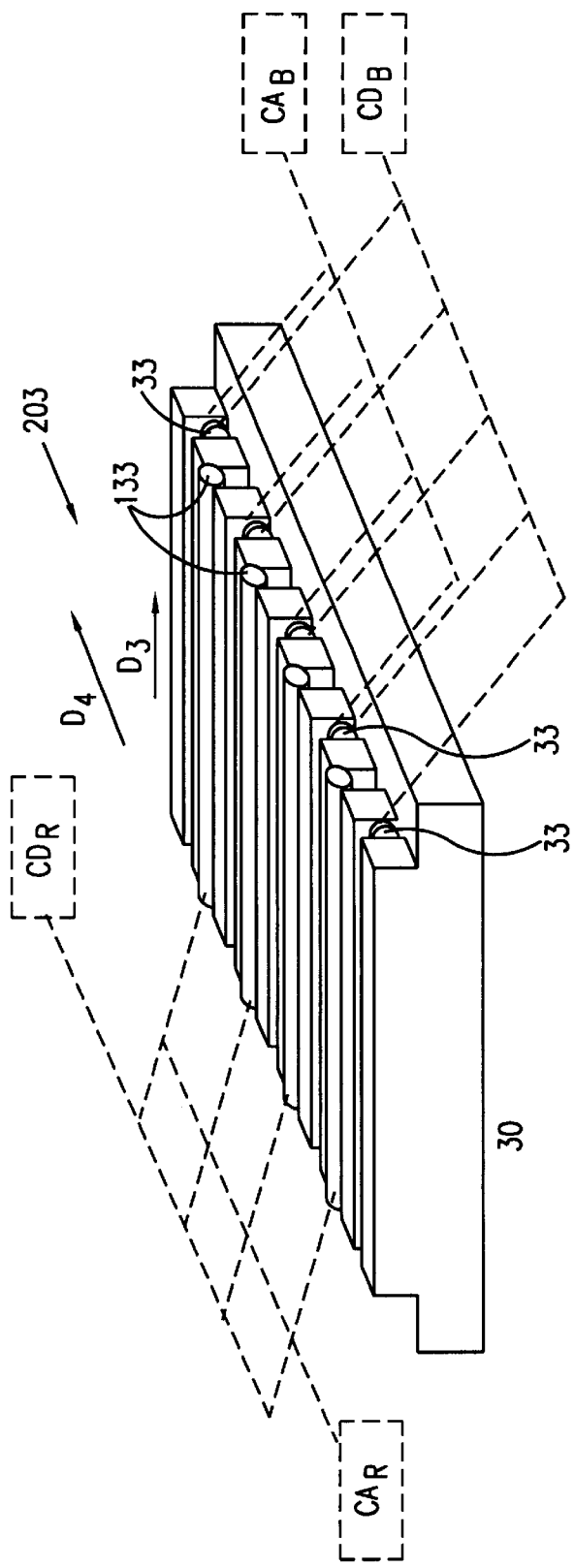

CONVEYOR TABLE HAVING SELECTIVELY ENABLED CONVEYOR ELEMENTS

FIELD OF THE INVENTION

The present invention relates to conveyor systems, and particularly to a conveyor table having selectively enabled conveyor elements.

BACKGROUND OF THE INVENTION

Conveyor systems are commonly used to convey articles to and through a processing station wherein various processing operations may be performed, such as a working operation on the article, an inspection operation on the article, or the like. Frequently, it is necessary or desirable that the article be firmly retained in place at the time the processing operation is formed. This may require moving the article from the conveyor system to a table equipped with a retainer arrangement, such as mechanical clamping elements, a vacuum system, or the like, for firmly retaining the article on the table during the performance of the processing operation, and then returning the article to the conveyor system after the processing operation has been completed.

SUMMARY OF THE INVENTION

An object of the present invention is to provide a conveyor table for use in a conveyor system to produce advantages in the above respects.

According to the present invention, there is provided a conveyor table, comprising: a supporting construction having a first supporting surface for supporting articles to be conveyed; a plurality of conveyor elements mounted to the supporting construction and defining a second supporting surface for supporting the articles to be conveyed; an actuator for selectively moving one of the supporting surfaces with respect to the other to selectively enable either the first supporting surface defined by the supporting construction to support the articles, or the second supporting surface defined by the conveyor elements to support the articles; and a drive for driving the conveyor elements to convey the articles in a predetermined direction when the articles are supported by the second supporting surface defined by the conveyor elements.

According to further features in all the preferred embodiments of the invention described below, the actuator moves the second supporting surface defined by the conveyor elements with respect to the first supporting surface defined by the supporting construction; the conveyor elements being movable either to an operative position projecting from the first supporting surface to engage and convey the articles in the predetermined direction, or to an inoperative position retracted within the first supporting surface. More particularly, in the described preferred embodiments, the first supporting surface is a flat surface formed with a plurality of spaced parallel recesses; the conveyor elements being movable either to an operative position projecting from the flat surface to engage and convey the articles in the predetermined direction, or to an inoperative position retracted within the recesses.

It will be appreciated, however, that in some applications of the invention, it may be desirable to move the first supporting surface (the supporting table construction) with respect to the second supporting surface (the conveyor elements) to selectively convey or not convey the articles.

As will be more particularly described below, a conveyor table constructed with the foregoing features can be used for conveying articles to and through a processing station without requiring removal of the articles from the conveyor system at the time the articles are being processed. Thus, the articles may be conveyed along the table by moving the conveyor elements to their operative projecting positions, and may be processed while on the table by moving the conveyor elements to their inoperative retracted positions within the recesses.

Several embodiments of the invention are described below for purposes of example.

In one described embodiment, the conveyor elements are driven parallel to the recesses and are effective, when in their operative projecting positions, to convey the articles parallel to the recesses. In this embodiment, the conveyor elements are preferably closed-loop belts.

A second embodiment is described wherein the conveyor elements are rotary elements rotated along axes parallel to the recesses and effective, when in their operative projecting positions, to convey the articles in the direction perpendicular to the recesses. In this embodiment, the rotary elements are preferably rollers. In the embodiment described below, they are elongated rollers such that each roller occupies a substantial part of the length of the respective recess. The conveyor elements; however, they could be in the form of a plurality of short rollers spaced from each other and interconnected by a shaft extending along the respective recess.

A further embodiment is described wherein both types of conveyor elements are provided in the table, thereby enabling the article to be selectively conveyed either parallel to the recesses or perpendicular to the recesses.

Further features and advantages of the invention will be apparent from the description below.

BRIEF DESCRIPTION OF THE DRAWINGS

The invention is herein described, by way of example only, with reference to the accompanying drawings, wherein:

FIGS. 2b and 2c illustrate the operative projecting positions and the inoperative retracted positions of the conveyor elements, respectively, in the conveyor table of FIG. 2a;

FIGS. 4a, 4b and 4c are views corresponding to FIGS. 2a, 2b and 2c, respectively, illustrating a further construction of conveyor table in accordance with the present invention.

DETAILED DESCRIPTION OF THE EMBODIMENTS

Figure 1:
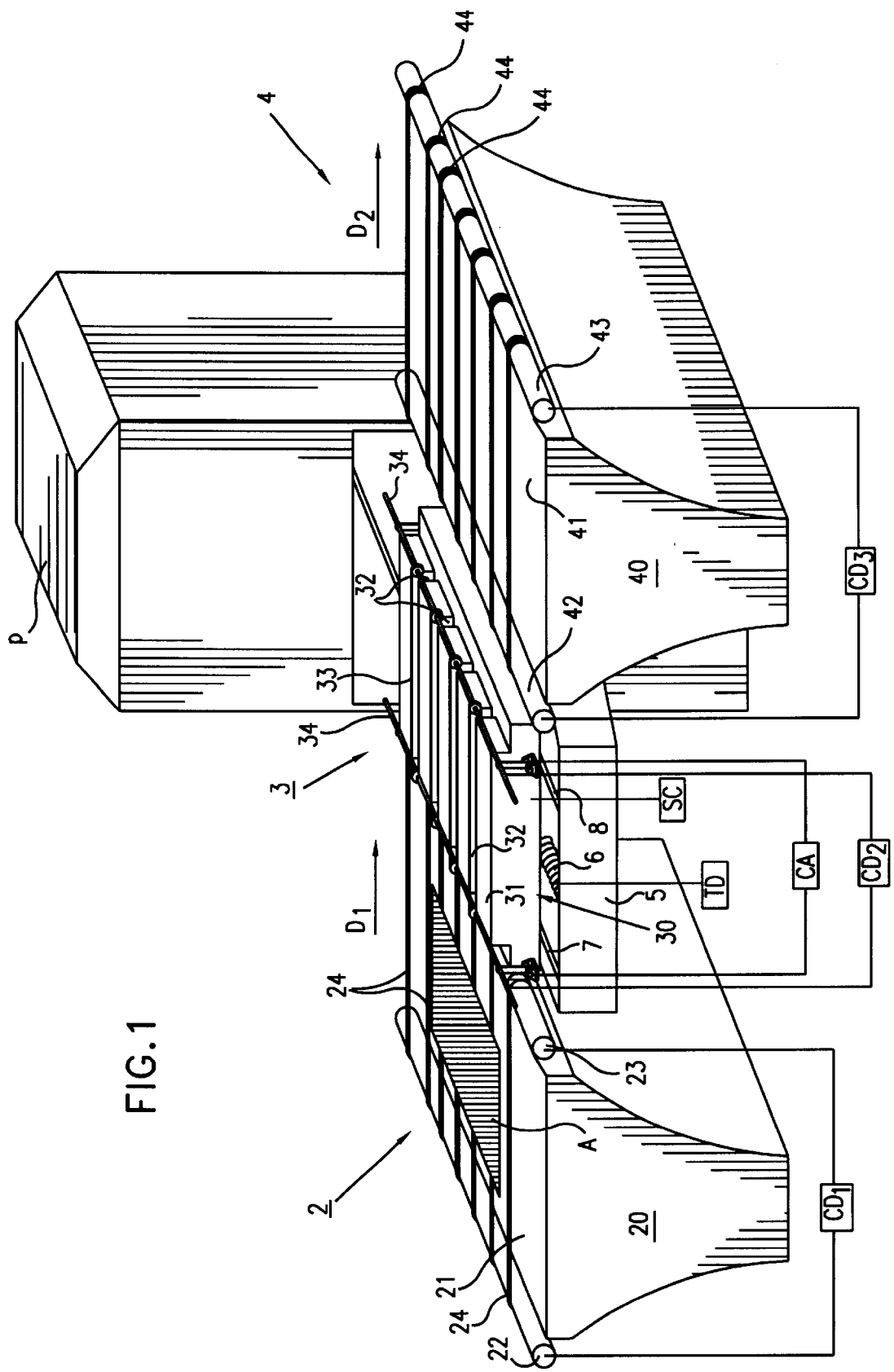
FIG. 1 illustrates one form of conveyor system constructed in accordance with the present invention.

With reference to FIG. 1, there is illustrated a conveyor system for conveying a plurality of articles, generally designated A, to and through a processing station occupied by a processing machine, generally designated P. As one example, the articles A may be printed circuit boards; and the processing machine P may be an optical inspection system for performing an inspection operation on the articles, a component applicator for applying a component to the article, or the like.

The conveyor system illustrated in FIG. 1 includes an inlet conveyor 2 upstream of the processing station occupied by processing machine P; a conveyor table 3 adapted to receive the articles A from the inlet conveyor 2 and adapted to move the articles to the processing station P for processing by the processing machine P; and an outlet conveyor 4 downstream of the processing station for receiving the articles after having been processed by the processing machine P.

In the example illustrated in FIG. 1, the conveyor table 3 is supported on an underlying frame structure 5 and is movable towards and away from the processing machine P by a screw 6 rotatably mounted on the frame structure 5 and received within a nut (not shown) fixed to the conveyor table 3. The upper surface of supporting structure 5 is provided with a pair of parallel guides or bearings 7, 8 for guiding the movements of conveyor table 3 towards or away from the processing machine P. Screw 6 is rotated by a table drive TD in one direction to move the conveyor table 3 towards the processing machine P, and in the opposite direction to move it away from the processing machine P.

The inlet conveyor 2 includes a supporting structure 20 formed with a flat upper surface 21. A pair of shafts 22, 23 extend transversely of supporting structure 20 on each side of its flat supporting surface 21. A plurality of closed-loop conveyor belts 24 are coupled at their opposite ends to the shafts 22, 23, and are supported in spaced parallel relationship along the length of the shafts. The two shafts 22, 23 are rotated by a conveyor drive $CD_1$, such that the articles A are conveyed by the closed-loop belts 24 in the direction $D_1$.

Figure 2A:
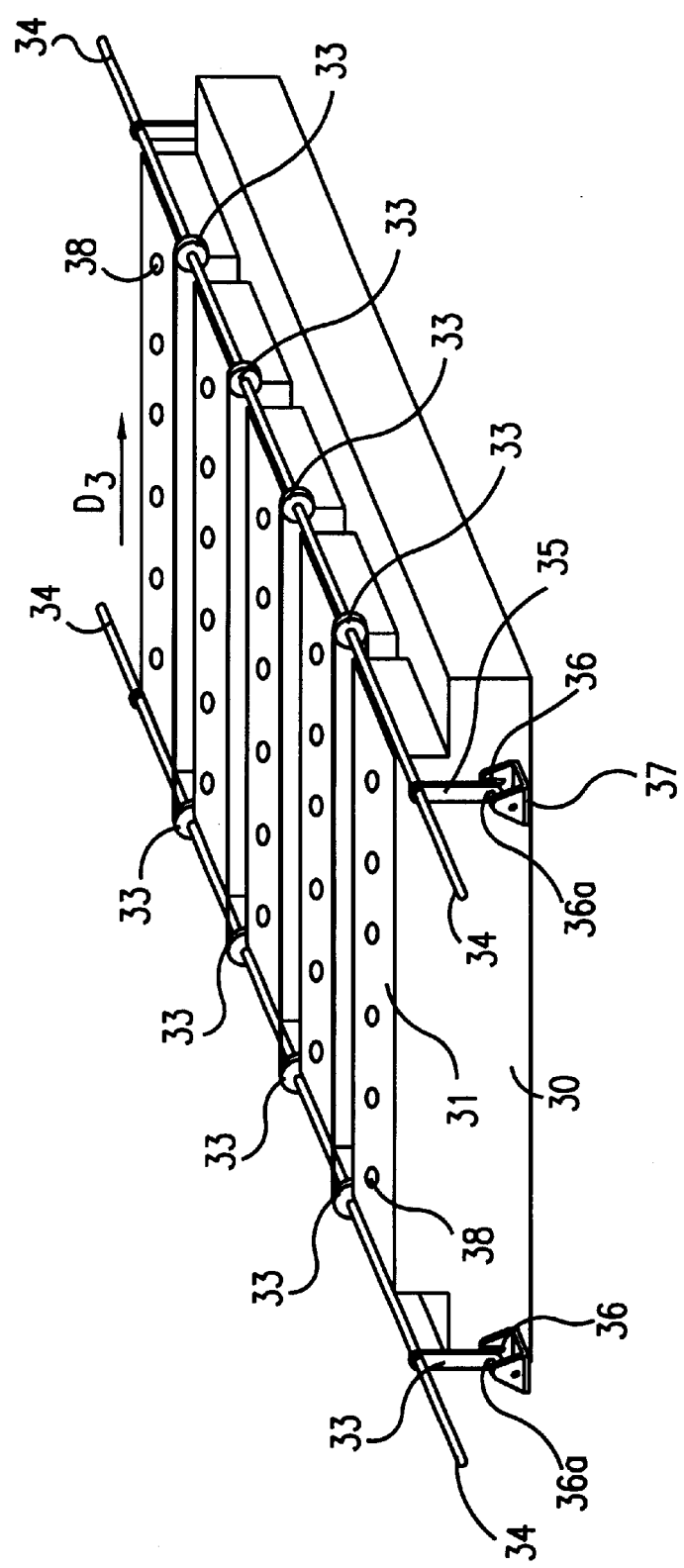
FIG. 2a illustrates only the conveyor table in the system of FIG. 1.

The structure of conveyor table 3, receiving the articles A from the inlet conveyor 2 for processing by the processing machine P, is more particularly illustrated in FIG. 2a. It includes a table 30 having a planar supporting surface 31 for supporting articles A to be conveyed by it Supporting surface 31 is formed with a plurality of spaced parallel recesses 32 extending in the direction ($D_1$, FIG. 1), in which the conveyor table 3 receives the articles from the inlet conveyor 2.

A plurality of conveyor elements, in the form of closed-loop conveyor belts 33, are located within recesses 32. The conveyor belts 33 are supported at their opposite ends by a pair of shafts 34 each extending transversely of the recesses 32 on opposite sides of the supporting surface 31. The opposite ends of each pair of shafts 34 are in turn supported by the upper ends of a pair of lifting rods 35. The opposite end of each lifting rod 35 is received within a pin 36, particularly within an intermediate offset section 36a of the pin. Each pin 36 is rotatably supported by a fixed bracket 37.

Figure 2B:
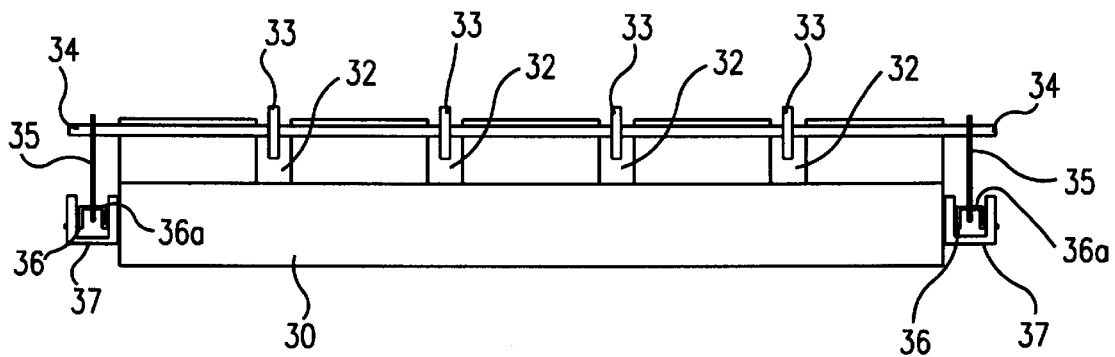

The shafts 34 may be rotated by a conveyor drive $CD_2$. They also may be selectively moved to an upper position or to a lower position by a conveyor actuator CA which rotates the lifting pins 36. Thus, if the lifting pins 36 are rotated such that their offset sections 36a are high (as shown in FIG. 2b) they cause lifting rods 35, coupled to these offset sections 36a, to raise shafts 34, and thereby the conveyor belts 33 to an operative position projecting from supporting surface 31 to engage and convey the articles A in the direction ($D_3$) of the recesses 32. However, when the pins 36 are rotated such that their offset sections 36a are low (as shown in FIG. 2c), their lifting rods 35 lower the shafts 34 to move the conveyor belts 33 to an inoperative position, retracted within the recesses 32.

Figure 2C:
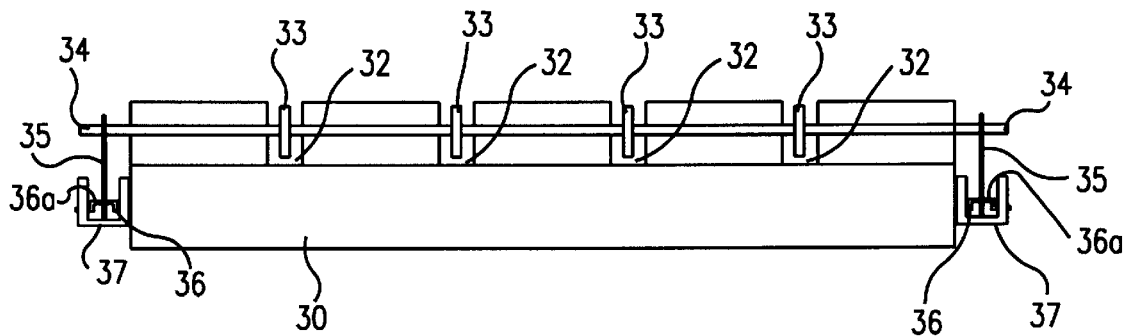

Table 30 is formed with vacuum openings 38 connected to a suction control SC to apply vacuum to the supporting surface 31 of the table in order to hold the articles firmly against the supporting surface when the conveyor loops 33 are in their inoperative retracted positions (FIG. 2c). Thus, the articles are firmly held against the supporting surface 31 when a processing operation is to be performed by processing machine M (FIG. 1) on the articles carried by the conveyor table 3.

After the processing operation is performed on these articles, they are conveyed by conveyor table 3 to the outlet conveyor 4. This outlet conveyor 4, as shown in FIG. 1, is similarly constructed as the inlet conveyor 2. Thus, it includes a supporting construction 40 having a flat upper surface 41 straddled by a pair of shafts 42, 43 for driving a plurality of closed-loop conveyor belts 44 extending along the length of structure 40 and spaced transversely of its supporting surface 41. The conveyor belts 44 in the outlet conveyor 4 are rotated by a conveyor drive $CD_3$.

The manner of using the conveyor system illustrated in FIGS. 1 and 2a–2c will be apparent from the above description.

Thus, the articles A to be conveyed are fed to the inlet conveyor 2 (in any suitable manner), and are conveyed by conveyor belts 34 in the direction $D_1$ towards conveyor table 3. In order to receive the articles so conveyed to it, the conveyor belts 33 in conveyor table 3 would normally be in their operative projecting positions (FIG. 2b) projecting above the upper surface 31 of the table, so as to engage and convey the articles in the direction $D_3$, namely parallel to the recesses 32. If, however, a processing operation is to be performed on the articles A while on the conveyor table 3, the conveyor actuator CA would be actuated in order to rotate the lifting pins 36 of the actuator assembly to lower their offset sections 36a. This lowers the shafts 34, supported by the lifting rods 35 and in turn supporting the conveyor belts 33, to the retracted positions of the conveyor belts within the recesses 32, thereby rendering them inoperative to engage the articles A on the conveyor table 3.

The suction control SC may then be actuated to apply suction to openings 38 in table 30, and thereby to firmly hold the articles A against the supporting surface 31 of the table 30 to enable a processing operation to be performed on the articles A.

FIG. 1 illustrates the arrangement wherein the processing machine P for performing the processing operation is located laterally of the normal position of the conveyor table 3. Therefore, while the articles A are firmly held to the supporting surface 31 of the table 30, the table drive TD may be actuated to rotated screw 6, and thereby to move conveyor table 3, together with the article A firmly held thereon, to the processing station defined by the processing machine P for performing the processing operation. After the processing operation has been performed, table drive TD may be energized in the reverse direction, to return the conveyor table 3 to its normal position illustrated in FIG. 1, in alignment with the inlet conveyor 2 and the outlet conveyor 4.

After the processing operation has been performed and the conveyor table 3 has returned to its normal position illustrated in FIG. 1, the conveyor actuator CA may again be energized to rotate the lifting pins 36 such as to raise their offset section 36a, and thereby to lift the shafts 34 and the conveyor belts 33 carried thereby, to their operative projecting positions to engage and convey the articles A to the outlet conveyor 4.

It will thus be seen that the illustrated apparatus permits the articles A to be conveyed to the processing station occupied by the processing machine P, and to be firmly held on the table 30 during a processing operation, without removing them from the conveyor table 3.

Figure 3A:
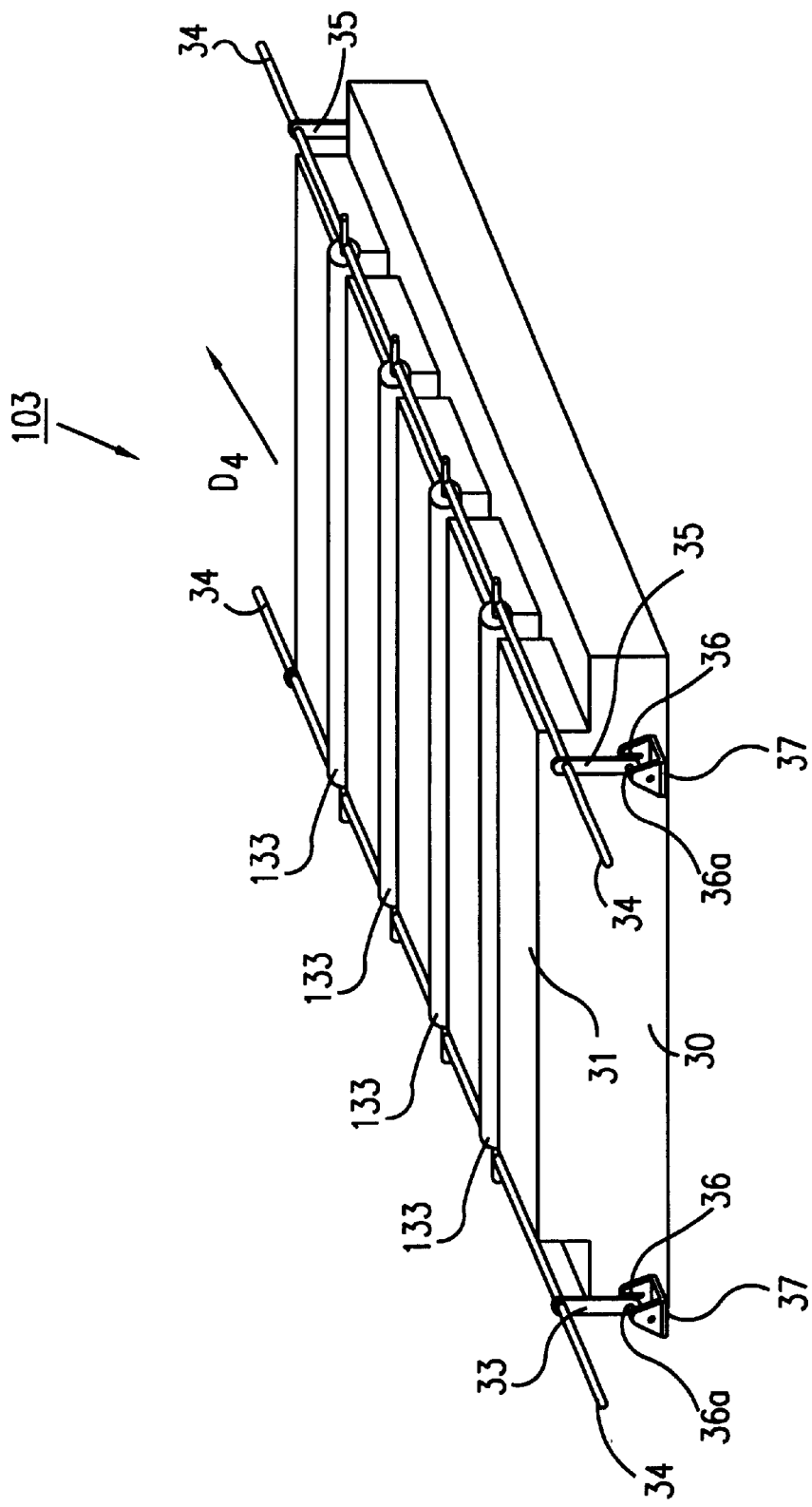
FIGS. 3a, 3b and 3c are views corresponding to FIGS. 2a, 2b and 2c, illustrating another construction of conveyor table in accordance with the present invention.
Figure 3B:
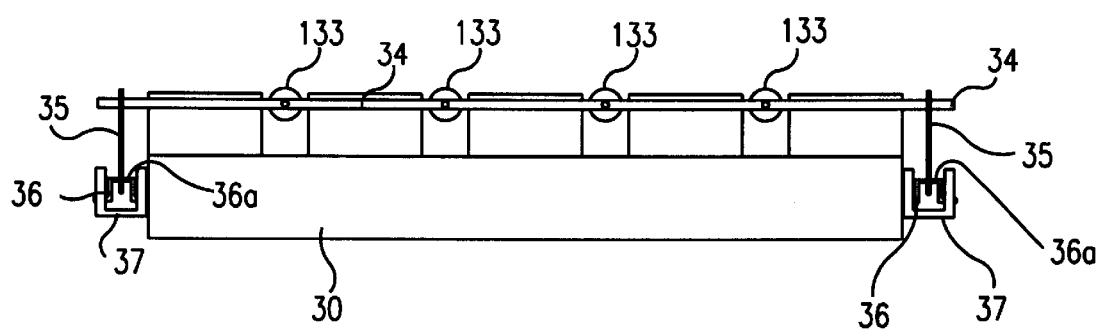
Figure 3C:
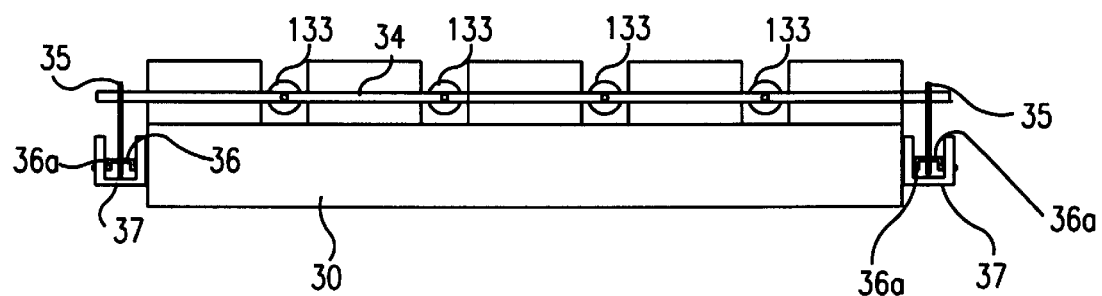

FIGS. 3*a*–3*c* illustrate another construction of the conveyor table, therein designated 103, that can be used for conveyor table 3 in FIGS. 1 and 2*a*–2*c*. Conveyor table 103 illustrated in FIGS. 3*a*–3*c* is basically of the same construction as described above with respect to conveyor table 3, and therefore corresponding elements have been numbered with the same reference numerals to facilitate understanding.

A main difference in conveyor table 103 is that the conveyor elements located within the recesses 32 formed in the supporting surface 31 of the conveyor table, are rollers 133, rather than closed-loop belts 33. Thus, when the rollers 133 are rotated (by conveyor drive $CD_2$, FIGS. 1 and 2*a*), they convey the articles A in the direction $D_4$ (i.e., perpendicular to the recesses 32), rather than in the direction $D_3$ (FIG. 2*a*) parallel to the recesses 32. In all other respects, the construction and operation of the conveyor table 103 illustrated in FIGS. 3*a*–3*c* are the same as described above with respect to FIGS. 2*a*–2*c*.

Figure 4B:
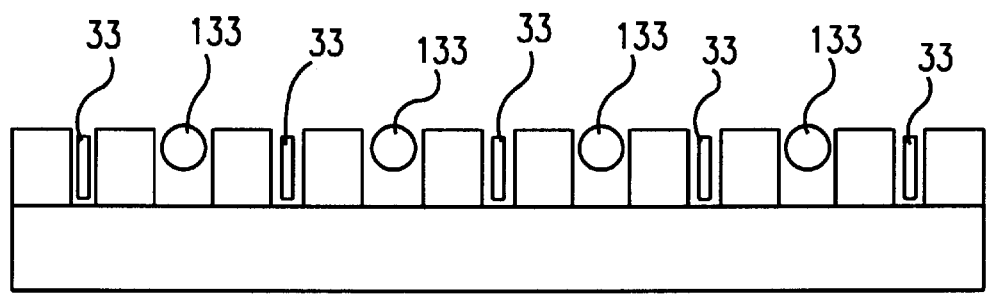
Figure 4C:
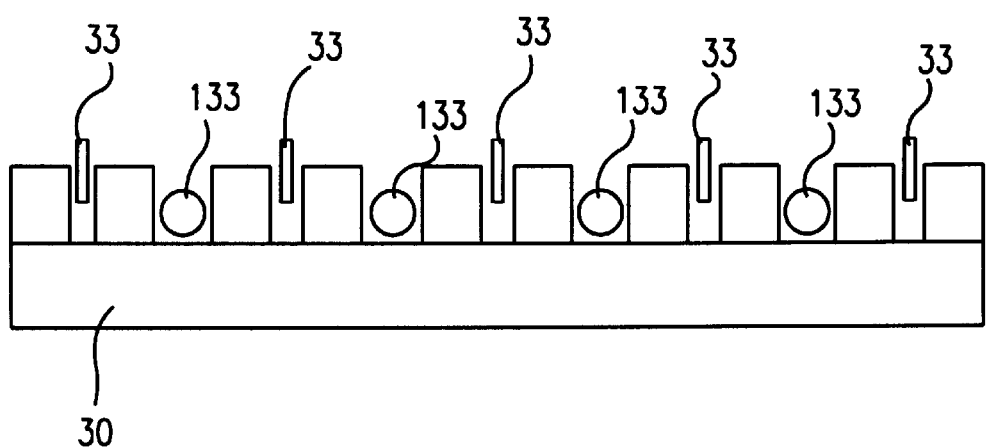

FIGS. 4*a*–4*c* illustrate a further construction of a conveyor table, therein designated 203, which may be used in the conveyor system. Again, in order to facilitate understanding, those elements in conveyor table 203 of FIGS. 4*a*–4*c* which are common to those in conveyor table 3 in FIGS. 2*a*–2*c* carry the same reference numerals.

A main difference in the conveyor table 203 illustrated in FIGS. 4*a*–4*c* is that it includes both the conveyor belt 33 of FIGS. 2*a*–2*c* for conveying the articles parallel to the direction of the recesses 32, and also the rollers 133 of FIGS. 3*a*–3*c* for conveying the articles perpendicularly to the recesses. Thus, alternate recesses 32 are provided with the conveyor belts 33, of FIGS. 2*a*–2*c*, while the remaining alternate recesses 32 are provided with the elongated rollers 133 of FIGS. 3*a*–3*c*. The conveyor belts 33 are driven by a conveyor drive $CD_B$, and are selectively moved to their operative projecting positions or their inoperative retracted position by a conveyor actuator $CA_B$; whereas the conveyor rollers 133 are all driven by a conveyor drive $CD_R$, and are selectively moved to their operative projecting positions or to their inoperative retracted positions by a conveyor operator $CA_R$.

It will thus be seen that when the conveyor belts 33 are raised to their operative projecting positions by actuator $CA_B$ and are rotated by the conveyor drive $CD_B$, the articles A will be conveyed in the direction $D_3$, parallel to the direction of the recesses 32; whereas when the rollers 133 are raised to their operative projecting positions by their actuator $CA_R$, and are rotated by their drive $CD_R$, the articles will be conveyed in the direction $D_4$, perpendicularly to the direction of the recesses 32.

FIGS. 5*a*–5*d* illustrate examples of various conveying arrangements that may be provided using the above-described conveyor tables for conveying articles with respect to a processing machine M.

Figure 5A:
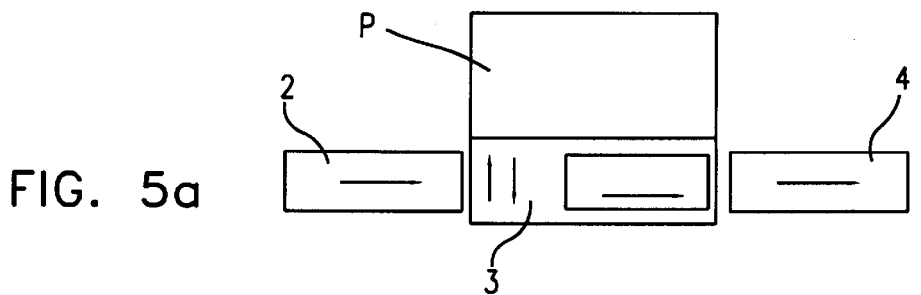
FIGS. 5a–5d illustrate examples of various arrangements that may be used for moving the articles to and through a processing station permitted by the conveyor system of the present invention.

FIG. 5*a* illustrates an arrangement similar to that of FIG. 1, wherein the conveyor system includes an inlet conveyor 2, a table conveyor 3, and an outlet conveyor 4. As described above, the table conveyor 3, when receiving articles, is driven by the table drive TD and screw 6 (FIG. 1) towards and away from the processing machine P, and then conveys the articles to the outlet conveyor 4.

Figure 5B:
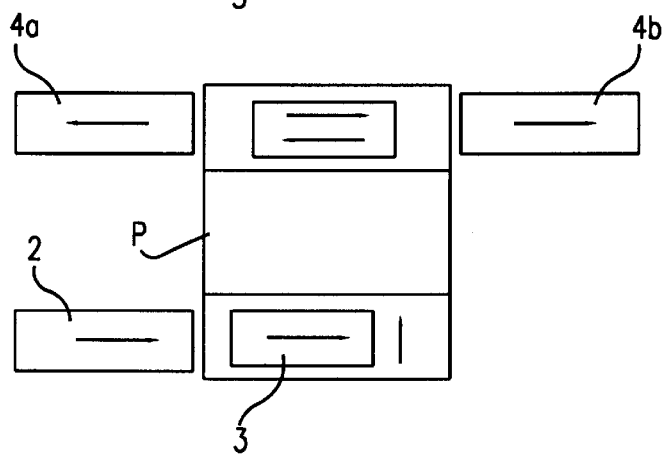

FIG. 5*b* illustrates an arrangement wherein the table conveyor 3, after conveying the articles to the processing machine P, selectively delivers the articles to either outlet conveyor 4*a* or outlet conveyor 4*b*, according to the direction in which its conveyor elements are rotated by its conveyor drive $CD_2$ (FIG. 1).

Figure 5C:
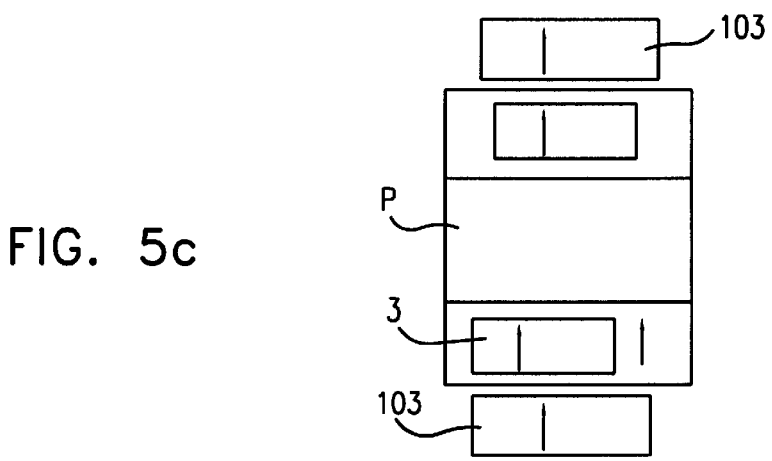

FIG. 5*c* illustrates an arrangement wherein a table conveyor 103, corresponding to that illustrated in FIGS. 3*a*–3*c*, conveys the articles to the processing machine P, and then to another table conveyor 103 acting as an outlet conveyor.

Figure 5D:
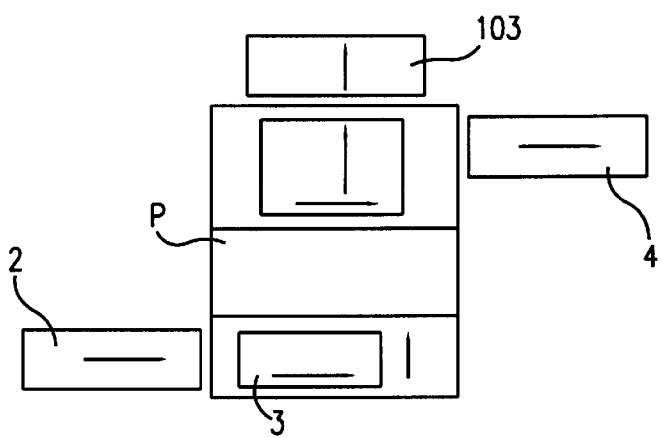

FIG. 5*d* illustrates an arrangement including a double-direction conveyor table 203, corresponding to that illustrated in FIGS. 4*a*–4*c*, which delivers the articles, after leaving the processing machine P, selectively to one of two outlet conveyors 4 or 103.

While the invention has been described with respect to several preferred embodiments, it will be appreciated that these are set forth merely for purposes of example, and that many variations may be made. For example, the supporting surface supporting the articles to be conveyed need not be a table formed with spaced parallel recesses, but rather could be a framework having a plurality of spaced parallel strips or bars. Also, the actuator for selectively moving the one of the supporting surfaces could move such a framework, or table formed with recesses, with respect to the conveyor elements. Further the table or framework need not be horizontal but could be at an incline. Many other variations, modifications and applications of the invention may be made.

What is claimed is:

1. A conveyor system for conveying an articles to a processing station, the system comprising:
   a first conveyor operative to convey an article in a first direction toward said processing station;
   at least one raisable and lowerable assembly, on said first conveyor and being operative to receive said article and to displace said article laterally and in a second direction transverse to said first direction; and
   at least one secure hold down assembly associated with said first conveyor and being operative to firmly hold down said article to said first conveyor at least at said processing station.

2. A conveyor table system for conveying an article to a processing station according to claim 1 and wherein said at least one raisable and lowerable assembly is operative to convey said article in a third direction, perpendicular to said second direction.

3. A conveyor table system for conveying an article to a processing station according to claim 1 and wherein said at least one secure hold down assembly comprises a vacuum table.

4. A conveyor table system for conveying an article to a processing station according to claim 2 and wherein said it least one secure hold down assembly comprises a vacuum table.

5. A conveyor table system for conveying an article to a processing station according to claim 1 and wherein said processing station is an inspection station.

6. A conveyor table system for conveying an article to a processing station according to claim 2 and wherein said processing station is an inspection station.

7. A conveyor table system for conveying an article to a processing station according to claim 3 and wherein said processing station is an inspection station.

8. A conveyor table system for conveying an article to a processing station according to claim 4 and wherein said processing station is an inspection station.

9. A conveyor table system for conveying an article to a processing station according to claim 5 and wherein said inspection station is an optical inspection station.

10. A conveyor table system for conveying an article to a processing station according to claim 6 and wherein said inspection station is an optical inspection station.

11. A conveyor table system for conveying an article to a processing station according to claim 7 and wherein said inspection station is an optical inspection station.

12. A conveyor table system for conveying an article to a processing station according to claim 8 and wherein said inspection station is an optical inspection station.

13. An optical inspection system for printed circuit boards comprising:
   a first conveyor operative to conveyor a printed circuit board in a first direction toward an optical inspection station;
   at least one raisable and lowerable assembly on said first conveyor and being operative to receive said printed circuit board and to displace said printed circuit board laterally and in a second direction transverse to said first direction; and
   at least one secure hold down assembly associated with said first conveyor and being operative to firmly hold down said printed circuit board to said first conveyor at said least at optical inspection station.

14. An optical inspection system for printed circuit boards according to claim 13 and wherein said at least one raisable and lowerable assembly is operative to convey said printed circuit board in a third direction, perpendicular to said second direction.

15. An optical inspection system for printed circuit boards according to claim 13 and wherein said at least one secure hold down assembly comprises a vacuum table.

16. An optical inspection system for printed circuit boards according to claim 14 and wherein said at least one conveyor table is also operative to convey said printed circuit board in a third direction, parallel to and opposite said second direction, from said optical inspection station back to said first conveyor.

17. An optical inspection system for printed circuit boards according to claim 14 and wherein said at least one secure hold down assembly comprises a vacuum table.

* * * * *